Nov. 26, 1968 R. MITTERER ET AL 3,413,625

APPARATUS FOR EVALUATING MAGNETIC READ SIGNALS

Filed Sept. 28, 1965 2 Sheets-Sheet 1

INVENTORS
RUDOLF MITTERER
PETER WENTZEL

BY Stiee & Stiee
ATTORNEYS

APPARATUS FOR EVALUATING MAGNETIC READ SIGNALS

Filed Sept. 28, 1965 2 Sheets-Sheet 2

INVENTORS
RUDOLF MITTERER
PETER WENTZEL
BY Stiee & Stiee
ATTORNEYS

United States Patent Office 3,413,625

Patented Nov. 26, 1968

3,413,625

APPARATUS FOR EVALUATING MAGNETIC READ SIGNALS

Rudolf Mitterer, Gauting, and Peter Wentzel, Munich, Germany, assignors to Siemens Aktiengesellschaft, Munich, Germany, a corporation of Germany Filed Sept. 28, 1965, Ser. No. 489,767
2 Claims. (Cl. 340—174.1)

ABSTRACT OF THE DISCLOSURE

A magnetic memory apparatus in which the read signals for separating information signals and interference signals are examined for ampliture and wave shape. The read signals are given simultaneously to amplitude discriminators which transmit a pulse when the amplitude of the read signals exceeds a first threshold or remains below a second threshold, and a first differentiator for evaluating the wave shape. A bistable flip-flop and a second differentiator are connected to the first differentiator to transmit a pulse each time that the differentiated read signal has a zero-axis crossing. The pulses of the second differentiator and of the amplitude discriminators are joined to one coincidence circuit.

The invention relates to a process for distinguishing between information and interference and read signals from a magnetic memory.

The information stored in a magnetic memory (magnetic tape apparatus, drum store, plate store or foil store) is picked up by means of read heads. The magnetic field of the magnetized layer moves past the read heads and induces voltages into the read heads, the voltages having stored information contained in the time sequence thereof. A read amplifier thereupon amplifies the read signals to a level suited for an evaluation. In the ideal case the signals are of equal amplitude and are situated in each case in the center of a given time slot with respect to the entire time sequence. As a consequence of mechanical imprecisions in the position of the write and read heads, however, read signals may occur which lead or lag during the time sequence and whose amplitudes deviate severely from a mean value. Even amplitude-masking processes offer no improvement, because of the great time displacement of the signals with respect to the time sequence.

In order to avoid errors occurring in amplitude evaluation, it is a known practice to evaluate, instead of the amplitude, the form of the read signals. The signals are differentiated with respect to time so that the differentiation equals zero when the signal is a maximum. As a result, there can be achieved a good allocation of a read signal to a certain time interval in the time sequence. In this reading process, however, interference signals of relatively small amplitude but great trailing-edge steepness may simulate read signals, since the magnitude of the first time derivative is dependent only on the steepness of the trailing-edge.

The object of the present invention is to provide a process which makes possible an analysis of the read signals according to information signals and interference signals.

According to the invention, this is achieved by the feature that the read information is examined once for its amplitude and, secondly, independently thereof, for its curve form. Expediently, the evaluation of the amplitude and of the form of the signals takes place simultaneously.

Other objects and features will appear in the following detailed description of the invention, having reference to the accompanying drawings, wherein.

In the drawings.

Figure 1:
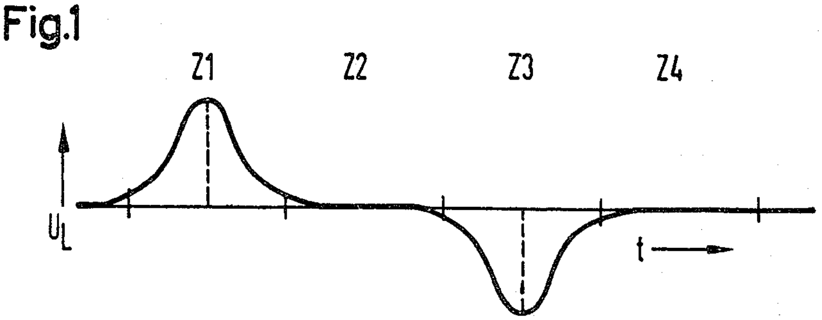
FIGURE 1 is a graph of voltage-versus-time for the output of a typical read amplifier.

Referring now to FIGURE 1, a signal is illustrated that represents a change of the magnetic state of a magnetic memory, which is present at the output of a read amplifier. The signal $U_L$ is positive (time slot Z1) or negative (time slot Z3), depending upon the direction of the change of the magnetic state.

Figure 2:
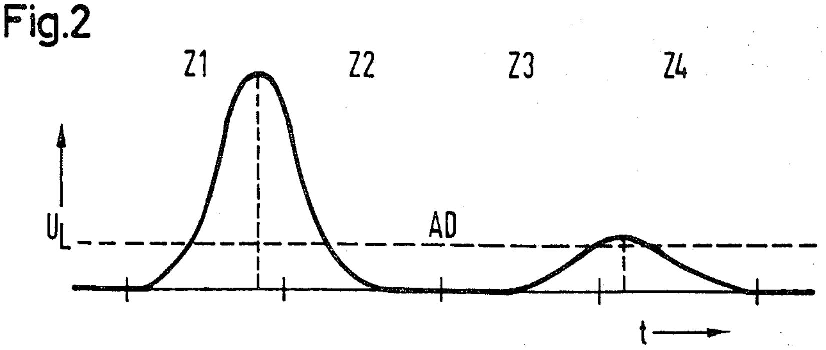
FIGURE 2 is a graph of voltage-versus-time to help better understand the present invention.

Referring now to FIGURE 2, a signal is illustrated that represents output signals that lead and lag in time sequence, and whose amplitudes deviate severely from a mean value. The signals in time slots Z1 and Z4 are two such signals. If the signal in time slot Z4 has not as yet been analysed for amplitude evaluation, then the considerably greater signal during time slot Z1 would erroneously be considered to be the same as the signal occurring during time slot Z2 due to the fact that each exceeds the same response threshold AD.

Figure 3:
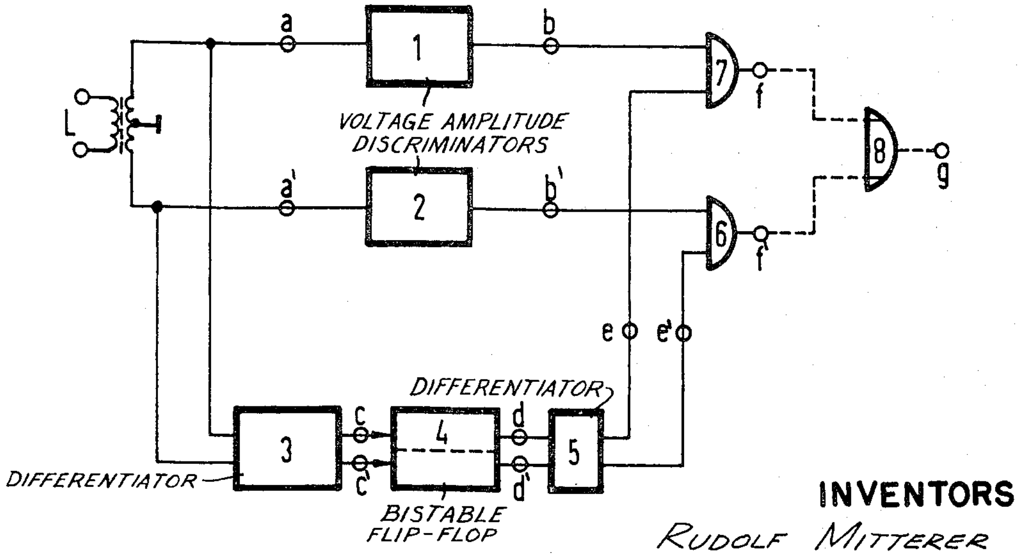
FIGURE 3 is a symbolic block diagram of a form of the present invention.

FIGURE 3 shows the circuit for the evaluation of read signals. It consists essentially of two voltage discriminators 1 and 2, which are coupled to the secondary side of a read signal transformer L. Similarly, a differentiating circuit 3, a bi-stable flip-flop 4 and a differentiating circuit 5 are connected to the secondary side of the read-signal transformer. The two voltage discriminators 1 and 2 as well as the two outputs of the differentiating circuit 5 are coupled to two coincidence gates 6 and 7 to form two outputs. The two outputs of the coincidence gates 6 and 7 can then still be joined through a mixing gate 8 to form one output.

Figure 4:
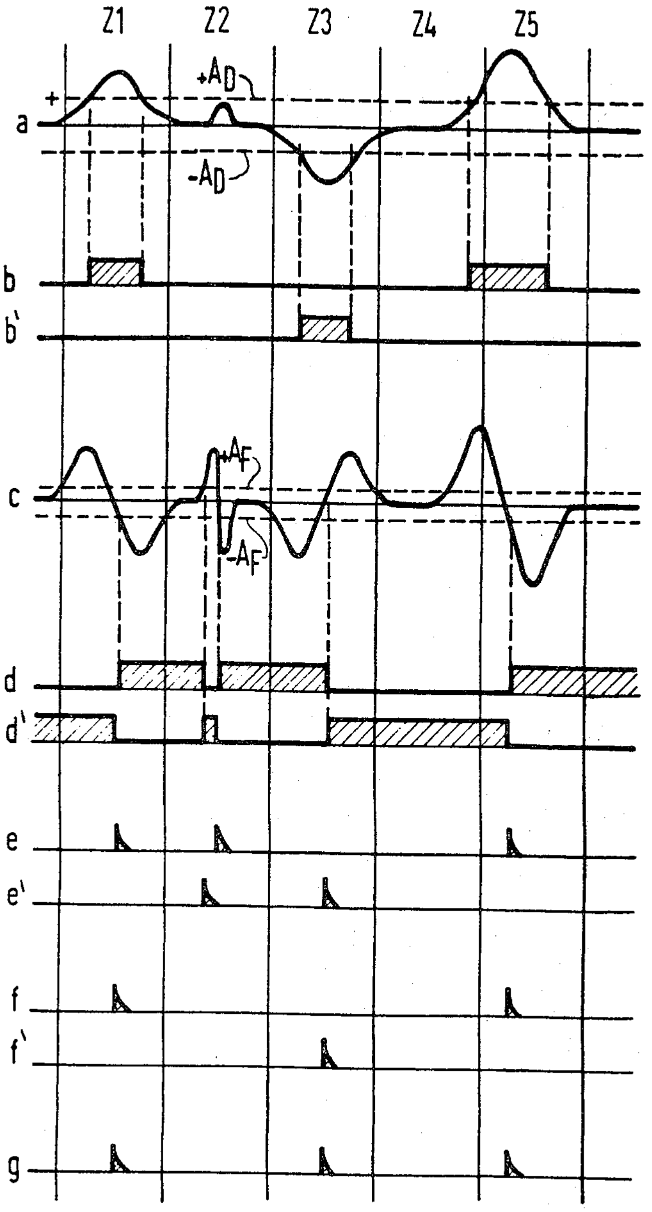
FIGURE 4 is a series of graphs for better understanding of the present invention.

Referring now to FIGURE 4, the time sequence of the voltages at various points in the circuit are represented. Graph *a* shows the amplified read signals at the points *a* and *a'* of FIGURE 3. On exceeding a predetermined response threshold $+A_D$ or $-A_D$, one of the discriminators 1 or 2 gives off a signal at the output *b* or *b'*. Simultaneously the read signal is differentiated with respect to time by the differentiating circuit. The voltage at outputs *c*, *c'* in FIGURE 3 is illustrated in the graph *c*. Here, a zero indication of the differentiation having a negative slope corresponds to a positive maximum of the read signal and vice versa.

A bi-stable flip-flop circuit 4 is controlled from the outputs *c*, *c'* of the differentiating circuit 3, thereby causing the flip-flop 4 to switch into one stable state after a zero indication with negative slope and is switched into the other stable state after a zero indication with positive slope. The voltage at the points *b*, *b'* are shown in graphs *b*, *b'* of FIG. 4. From the positive trailing edges of the voltages at the outputs of the bi-stable flip-flop 4, trigger pulses are obtained by means of the differentiating circuit 5, whose output voltage is shown in the graphs *e* and *e'*. At the time of the maximum of a positive read signal, a pulse is transmitted to the input *e* of the coincidence gate 7 or, in the case of a negative read signal, to the input *e'* of the coincidence gate 6. If the read signal fulfills the amplitude condition, then the signal of the voltage discriminators 1 and 2, which is reproduced in the graphs *b* and *b'*, appears at the second inputs *b*, *b'* of the coincidence gate 6 or 7.

At the outputs *f* and *f'* of the coincidence gates 6 and 7, a signal appears only if the criteria for form, amplitude and polarity of the read signal are fulfilled. Now, if the time slot Z2 in FIG. 4 is observed, one finds a signal occurs that remains below the response threshold $+A_D$ of the amplitude discriminator. This signal has, however, a great trailing-edge steepness, so that the differentiated signal achieves only the same height as a normal read signal. Since this interference signal does not, however, fulfill the amplitude condition, no signal appears at the output *f* or *f'* of the coincidence circuits 6 and 7 (graphs *f* and *f'*, time slot Z2). On the other hand, a circuit that operates solely according to the differentiating process would evaluate the interference voltage as a genuine read signal.

Similarly, a circuit which evaluates the read signals solely according to their amplitude, also fails in the case of a signal as shown in FIG. 4 for time slot Z5 of graph *a*, since the portion of the signal in time slot Z4 lies over the response threshold $A_D$ of the amplitude discriminators. Due to the leading edge of this read signal with respect to the time sequence, the amplitude evaluator responds prematurely in time slot Z4 and thus reads an information signal during this time slot, which was not originally contained therein. With the proposed method according to the invention, however, this signal is rightly recognized and allotted to the time slot Z5, since it is only there that it reaches its maximum.

It will be apparent that many modifications and variations may be effected without departing from the scope and the novel concepts of this invention.

We claim as our invention:

1. An apparatus for the evaluation of read signals having a first and a second polarity comprising:

discriminator means for generating an amplitude signal in response to said read signal exceeding a given amplitude, said discriminator means including a first discriminator responsive to said first polarity signals and a second discriminator responsive to said second polarity signals;

differentiating means for generating a slope signal in response to said read signal having a maximum amplitude, said differentiating means including a first differentiating device responsive to said first and second polarity signals, a bistable flip-flop having a first and second stable state responsive to said first differentiating device for entering a stable state corresponding to the polarity of the read signal, and a second differentiating device responsive to said bistable flip-flop, said second differentiating device having a first and a second output;

coincidence means for generating an output signal in response to the coincidence of said amplitude signal and said slope signal, said coincidence means including a first and a second coincidence gate, and first coincidence gate having a first and second input coupled to said first discriminator and said first output of said second differentiating device, respectively, said second coincidence gate having a first and a second input coupled to said second discriminator and said second output of said second differentiating device, respectively.

2. An apparatus according to claim 1, further including a mixing gate responsive to said first coincidence gate and alternatively to said second coincidence gate.

References Cited

UNITED STATES PATENTS

| | | |
|---|---|---|
| 3,281,806 | 10/1966 | Lawrance et al. |
| 3,251,047 | 5/1966 | Morley. |

BERNARD KONICK, *Primary Examiner.*

A. I. NEUSTADT, *Assistant Examiner.*